(12) United States Patent
Malik et al.

(10) Patent No.: US 9,420,610 B2
(45) Date of Patent: Aug. 16, 2016

(54) ESTIMATING WIRELESS CAPACITY

(71) Applicant: QUALCOMM Incorporated, San Diego, CA (US)

(72) Inventors: Rahul Malik, San Diego, CA (US); Jay Kumar Sundararajan, San Diego, CA (US); Manu Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/445,870

(22) Filed: Jul. 29, 2014

(65) Prior Publication Data

US 2016/0037558 A1    Feb. 4, 2016

(51) Int. Cl.
*H04J 3/16* (2006.01)
*H04J 3/00* (2006.01)
(Continued)

(52) U.S. Cl.
CPC .............. *H04W 74/08* (2013.01); *H04W 72/00* (2013.01); *H04W 84/12* (2013.01)

(58) Field of Classification Search
CPC ..... H04W 16/14; H04W 28/10; H04W 48/06; H04W 72/00; H04W 72/005; H04W 72/04; H04W 72/0446; H04W 72/0486; H04W 72/10; H04W 72/12; H04W 72/1226; H04W 72/1242; H04W 74/04; H04W 74/06; H04W 74/08; H04W 74/0808; H04W 74/0816; H04W 74/085; H04W 84/12; H04W 88/08; H04W 88/10; H04L 1/1854; H04L 5/003; H04L 47/12; H04L 47/14; H04L 47/24; H04L 47/621; H04L 49/90; H04L 65/80; H04K 2203/18

USPC ......... 370/229–240, 310–350, 431–465, 478, 370/249–253, 498–521; 455/431–455
See application file for complete search history.

(56) References Cited

U.S. PATENT DOCUMENTS 7,289,529 B2 * 10/2007 Sherman ................. H04L 47/24
370/461
7,496,110 B1 * 2/2009 Beser ................. H04N 7/17309
370/458

(Continued)

OTHER PUBLICATIONS

Cao Y., et al., "Wireless packet scheduling for two-state link models", Globecom'02. 2002—IEEE Global Telecommunications Conference. Conference Proceedings. Taipei, Taiwan, Nov. 17-21, 2002; [IEEE Global Telecommunications Conference], New York, NY : IEEE, US; vol. 1, Nov. 17, 2002, pp. 819-823, XP010636064, DOI: 10.1109/GLOCOM.2002.1188192 ISBN: 978-0-7803-7632-8.

(Continued)

*Primary Examiner* — Tri H Phan
(74) *Attorney, Agent, or Firm* — Paradice and Li LLP

(57) ABSTRACT

A system and method are disclosed that may provide an accurate estimate of an AP's available medium share. The AP may perform a plurality medium access contention operations to determine a duration of a transmit opportunity and a queue service interval for each of a plurality of access categories. The AP may also determine a queue service interval for a number of packet queues associated with each of the access categories. The AP may use timing information derived from the medium access contention operations to estimate a portion of the medium share available on a per-access category and/or per-user basis. The timing information may include the transmit opportunity durations and queue service intervals for the access categories, the queue service intervals for the individual packet queues, and/or values indicative of the AP's PHY rate and medium utilization.

30 Claims, 7 Drawing Sheets

(51) Int. Cl.
*H04B 7/212* (2006.01)
*H04W 72/00* (2009.01)
*H04W 74/08* (2009.01)
*H04W 84/12* (2009.01)

(56) References Cited

U.S. PATENT DOCUMENTS

| | | | |
|---|---|---|---|
| 7,889,663 B1 | 2/2011 | Wright et al. | |
| 8,184,582 B2* | 5/2012 | Banerjee | H04W 16/14 370/329 |
| 8,520,683 B2* | 8/2013 | Ryan | H04L 12/4035 370/395.21 |
| 8,614,956 B2 | 12/2013 | Baliga et al. | |
| 2005/0147041 A1* | 7/2005 | Zaki | H04L 47/14 370/235 |
| 2005/0185580 A1 | 8/2005 | Conte et al. | |
| 2005/0197148 A1 | 9/2005 | Ali et al. | |
| 2006/0227801 A1* | 10/2006 | Nanda | H04L 12/5695 370/447 |
| 2007/0195787 A1 | 8/2007 | Alnuweiri et al. | |
| 2007/0211697 A1 | 9/2007 | Noble | |
| 2008/0171550 A1* | 7/2008 | Zhao | H04W 74/02 455/445 |
| 2010/0165963 A1* | 7/2010 | Chu | H04L 12/43 370/338 |
| 2012/0182886 A1* | 7/2012 | Ong | H04W 74/0816 370/252 |
| 2013/0070715 A1 | 3/2013 | Nanda et al. | |
| 2013/0182610 A1 | 7/2013 | Pantelidou et al. | |
| 2014/0003412 A1 | 1/2014 | Park et al. | |
| 2014/0119268 A1* | 5/2014 | Chu | H04W 74/04 370/312 |

OTHER PUBLICATIONS

Fallah Y.P., et al., "A Unified Scheduling Approach for Guaranteed Services over IEEE 802.lle Wireless LANs", Broadband Networks, 2004. First International Conference on San Jose, CA, USA Oct. 25-29, 2004, Piscataway, NJ' USA, IEEE, Oct. 25, 2004, pp. 375-384, XP010749113, DOI: 10.1109/BROADNETS.2004.14 ISBN: 978-0-7695-2221-0.

Ghazizadeh T., et al., "Queuing Analysis of HCCA for Multi-Rate Wireless LANs with Truncated ARQ Protocol", Wireless Personal Communications, Kluwer Academic Publishers, DO, vol. 55, No. 4, Sep. 26, 2009, pp. 607-630, XP019832989, ISSN: 1572-834X.

International Search Report and Written Opinion—PCT/US2015/041206—ISA/EPO—Sep. 28, 2015.

Luo H., et al., "An Optimized Scheduling Scheme to Provide Quality of Service in 802.11 e Wireless LAN", 11th IEEE International Symposium on Multimedia 2009, ISM '09, IEEE, Piscataway, NJ, USA, Dec. 14, 2009, pp. 651-656, XP031590225, ISBN: 978-1-4244-5231-6.

Yu X., et al., "Performance analysis of distributed resource reservation in IEEE 802.11 e-based wireless networks", IET Communications, The Institution of Engineering and Technology, Michael Faraday House, Six Hills Way, Stevenage, Herts, SG1 2AY, UK, vol. 6, No. 11, Jul. 24, 2012, pp. 1447-1455, XP006039521, ISSN: 1751-8628, DOI: 10.1049/IET-COM.2011.0464.

Co-pending U.S. Appl. No. 14/446,010, filed Jul. 29, 2014.

* cited by examiner

ESTIMATING WIRELESS CAPACITY

TECHNICAL FIELD

The present embodiments relate generally to wireless networks, and specifically to estimating the available capacity of a wireless access point or network.

BACKGROUND OF RELATED ART

A wireless local area network (WLAN) may be formed by one or more access points (APs) that provide a shared wireless communication medium for use by a number of client devices or stations (STAs). Each AP, which may correspond to a Basic Service Set (BSS), periodically broadcasts beacon frames to enable any STAs within wireless range of the AP to establish and/or maintain a communication link with the WLAN. In a typical WLAN, only one STA may use the wireless medium at any given time, and each STA may be associated with only one AP at a time. Due to the increasing ubiquity of wireless networks, when a STA seeks to join a wireless network, the STA may have a choice between multiple wireless networks and/or between multiple APs that form an extended BSS. At present, STAs may use a received signal strength indicator (RSSI) value to select the best available WLAN to join and/or the best available AP to associate with. RSSI values do not provide any indication of the capacity that would be available to the "new" STA. The new STA may use information indicating how many STAs are currently associated with an AP as a gauge of the AP's available capacity. However, the number of STAs currently associated with an AP may not account for current activity (e.g., traffic levels and/or traffic types) of the associated STAs, and therefore may not provide an accurate indication of available capacity.

Thus, it would be desirable for STAs to have a more accurate estimate of the available capacity of APs when deciding which AP to associate with.

BRIEF DESCRIPTION OF THE DRAWINGS

The present embodiments are illustrated by way of example and are not intended to be limited by the figures of the accompanying drawings.

Like reference numerals refer to corresponding parts throughout the drawing figures.

DETAILED DESCRIPTION

Figure 1:
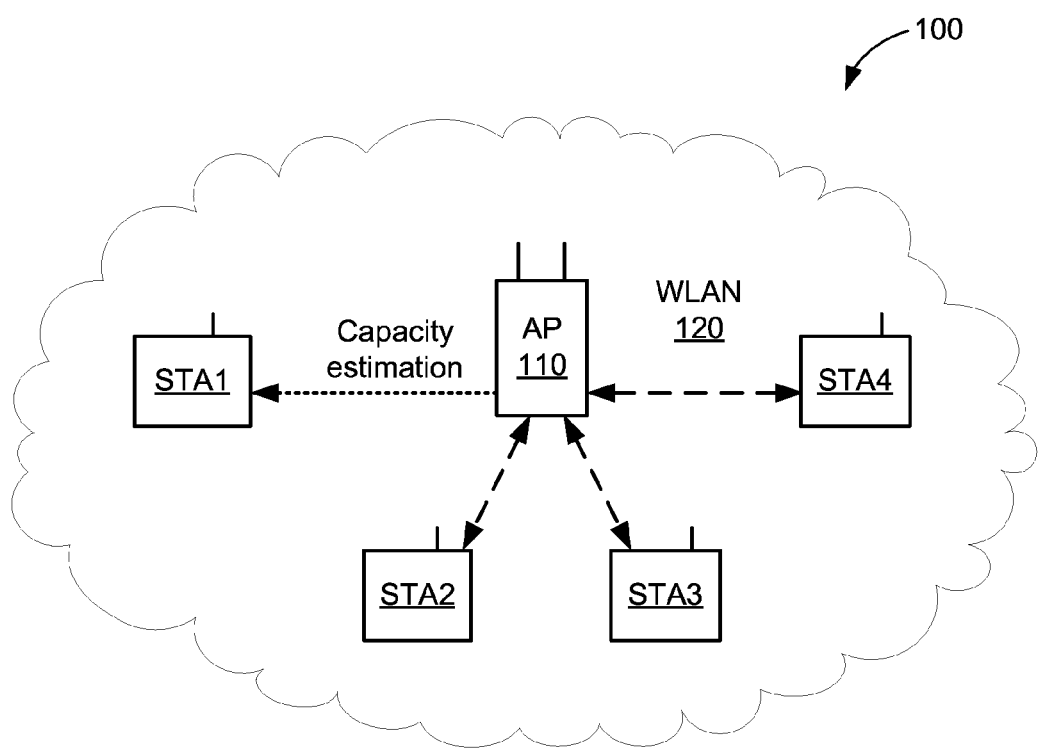
FIG. 1 shows a block diagram of a WLAN system within which the present embodiments may be implemented.

The present embodiments are described below in the context of estimating available capacity of WLAN systems for simplicity only. It is to be understood that the present embodiments are equally applicable to estimating available capacity for other wireless networks (e.g., cellular networks, pico networks, femto networks, satellite networks), as well as for systems using signals of one or more wired standards or protocols (e.g., Ethernet and/or HomePlug/PLC standards). As used herein, the terms "WLAN" and "Wi-Fi®" may include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, although described below in terms of an infrastructure WLAN system including an AP and a plurality of STAs, the present embodiments are equally applicable to other WLAN systems including, for example, WLANs including a plurality of APs, peer-to-peer (or Independent Basic Service Set) systems, Wi-Fi Direct systems, and/or Hotspots. In addition, although described herein in terms of exchanging data packets between wireless devices, the present embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

In the following description, numerous specific details are set forth such as examples of specific components, circuits, and processes to provide a thorough understanding of the present disclosure. The term "coupled" as used herein means connected directly to or connected through one or more intervening components or circuits. The term "medium access" as used herein may refer to gaining and/or controlling access to a shared communication medium. The term "transmit opportunity" (TXOP) as used herein may refer to a period of time during which a device (or a portion of the device) may transmit data via the shared communication medium. Further, the term "Traffic Identifier (TID)" refers to a traffic classification indicating the relative priority level of the traffic, and the term "access category" refers to data that may be queued together or aggregated according to priority level. Thus, as used herein, the terms "TID," "access category," and "priority level" may be used interchangeably. However, it is to be understood that, for at least some embodiments, there may not be a one-to-one correspondence between TID values and access categories. Further, as used herein, each access category may be associated with a particular contention engine that is to contend for medium access on behalf of queued data belonging to the access category. Further, the term "medium share" refers to a portion of the wireless medium's resources that may be allocated to a particular access category and/or to a particular user. In one instance, the resources may be a share of time.

Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The present embodiments are not to be construed as limited to specific examples described herein but rather to include within their scopes all embodiments defined by the appended claims.

As mentioned above, when a "new" STA seeks to associate with a particular AP (or to join a particular WLAN), it is desirable for the new STA to have information indicating the amount of capacity or medium share that would be available to the new STA. Existing methods and systems that indicate the number of STAs currently associated with the AP and/or that provide RSSI values and/or medium utilization value to the new STA may not provide an accurate estimate of medium share that would be available to the new STA. Applicant has found that a more accurate estimation of the AP's available capacity may be derived from the number of active STAs associated with the AP, wherein an active STA may be defined as a STA that is currently exchanging data with the AP. Although providing a better estimate of available medium share than the number of currently associated STAs, the number of active STAs may not account for the priority levels of data transmitted over the wireless medium. Data priority levels may be important in determining available medium share because the AP and/or its associated STAs may transmit data of higher priority levels sooner and/or more frequently than data of lower priority levels. Thus, the capacity available to the new STA may depend upon the priority levels of data to be exchanged between the new STA and the AP (as well as the priority levels of data being exchanged between AP and its associated STAs).

Other factors that may influence the medium share available to the new STA may include the mix of uplink and downlink traffic, the presence of STAs associated with other nearby APs and/or WLANs, and the capabilities of the currently associated STAs. Additionally, the actual medium share available to the new STA may be affected by one or more wireless medium parameters including, for example, RSSI values, channel conditions, interference, and so on.

Accordingly, the present embodiments may provide a more accurate estimate of available capacity (e.g., as compared to conventional systems described above) by considering (1) TXOP durations, (2) service intervals between successive grants of medium access for each access category and/or for each destination address, (3) the priority levels of queued downlink data, (4) the mix of uplink and downlink traffic, (5) the presence of STAs associated with other nearby APs and/or WLANs, (6) the capabilities of the currently associated STAs, and/or (7) interference on the wireless medium. For some embodiments, the AP may perform a plurality of medium access contention operations for queued downlink data belonging to different access categories to generate timing information indicating how often each access category is granted medium access (e.g., relative to other access categories). The timing information may be used to determine a service interval for each access category and/or for each queue associated with a given access category. Transmit opportunity (TXOP) durations may also be determined for each access category. Then, portions of the AP's medium share that would be available to each of the access categories when a new flow is added may be estimated based, at least in part, on the TXOP durations and the service intervals.

Before describing the present embodiments in more detail, Applicant notes that the IEEE 802.11 standards define a distributed coordination function (DCF) that instructs individual STAs (and APs) to "listen" to the medium to determine when the medium is idle (e.g., using a "carrier sense" technique). For example, only when a STA detects that the medium has been continuously idle for a DCF Interframe Space (DIFS) duration may the STA attempt to transmit data on the medium. To prevent multiple devices from accessing the medium at the same time, each device (e.g., each STA and/or AP) may select a random "back-off" number or period. At the end of the DIFS duration, a contention period begins during which each device waits for a period of time determined by its back-off number (e.g., its back-off period) before it attempts to transmit data on the medium. The device that selects the lowest back-off number has the shortest back-off period, and therefore "wins" the medium access contention operation. The winning device may be granted access to the shared wireless medium for a period of time commonly referred to as the transmit opportunity (TXOP), during which the winning device may transmit data over the shared wireless medium.

Data may be selected for transmission over the shared medium according to priority levels, for example, so that higher priority data (e.g., voice data) may be allocated higher transmission priorities than lower priority data (e.g., emails). More specifically, data of different priority levels may be assigned different ranges of back-off numbers so that higher priority data is more likely to win a given medium access contention period than lower priority data (e.g., by assigning lower back-off numbers to higher priority data and assigning higher back-off numbers to lower priority data). The different ranges of back-off numbers may be allocated to different priority levels of data by classifying data into access categories, and then providing a different range of back-off numbers to each access category (AC).

For the example embodiments described herein, data may be assigned to one of four access categories (AC0-AC3): the highest priority data (e.g., voice data) may be assigned to the first access category (AC0); the second highest priority data (e.g., video data) may be assigned to the second access category (AC1); the third highest priority data (e.g., data associated with a "best effort" QoS) may be assigned to the third access category (AC2); and the lowest priority data (e.g., background data) may be assigned to the fourth access category (AC3). Although described herein with respect to four access categories AC0-AC3, the present embodiments are applicable to systems that may include other numbers of access categories or priority levels. More specifically, for some example embodiments, the access categories AC0-AC3 described herein may correspond to the access categories AC_VO, AC_VI, AC_BE, and AC_BK, respectively, associated with one or more of the IEEE 802.11 standards. For other embodiments, the access categories AC0-AC3 described herein may be applicable to access categories or priority levels for other wireless protocols (e.g., cellular and Bluetooth®) and/or to wired protocols (e.g., Internet Protocol, Ethernet, HomePlug, powerline, EPON, EPOC, and so on).

According to the enhanced distributed coordination channel access (EDCA) function described in the IEEE 802.11 standards, each STA is to include a different transmit queue for each access category (AC), and the transmit queues are to independently contend for medium access. Because the AP may serve multiple STAs at the same time, the AP may include a plurality of transmit queues for each AC. More specifically, the AP may classify downlink data (e.g., data to be transmitted to one or more of its associated STAs) based on a traffic identifier (TID) and a destination address (DA). The destination address (DA) indicates to which STA the data is to be transmitted. The TID indicates the priority level of the data, and may thus be mapped to a corresponding access category. By classifying downlink data according to its TID and DA, the AP may aggregate data of the same priority level in a common set of AC queues that select from a corresponding range of back-off numbers. The aggregated data may be transmitted over the wireless medium as aggregated data frames such as, for example, aggregate MAC protocol data units (AMPDUs) and/or aggregate MAC service data units (AMSDUs).

Applicant notes that the time interval between successive contention period wins for a selected access category may be influenced by the number of other access categories simultaneously contending for medium access, by the priority of the selected access category relative to the priorities of the other access categories, by the amount of queued downlink data for each of the access categories, by the TXOP durations, and/or by the amount of traffic on medium. Applicant has discovered that because the available medium share of an AP may be related to the time interval between successive contention period wins for its access categories, timing information derived from a plurality of medium access contention operations and corresponding TXOP durations may provide a more accurate estimate of an AP's available capacity than conventional solutions (e.g., based on the number of STAs associated with the AP). Accordingly, the present embodiments may provide an estimate of an AP's available capacity (CAP) for a selected access category by dividing the TXOP duration of the selected access category by the service interval for the selected access category, as may be generally expressed as:

$$CAP = \frac{TXOP}{\text{Service Interval}}. \quad (1)$$

For other embodiments, portions of the AP's available capacity may be estimated on a per-access category basis and/or on a per-user basis. Per-access category estimates of available medium share may be based, at least in part, on the TXOP durations of the different access categories and each access category's queue service interval (acQSI), as described in more detail below. Per-user estimates of available medium share may be based, at least in part, on the TXOP durations of the different access categories, the access category queue service intervals (acQSI), and the per-user queue service interval (QSI), as described in more detail below.

FIG. 1 is a block diagram of a wireless network system 100 within which the present embodiments may be implemented. The system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1 for simplicity, it is to be understood that WLAN 120 may be formed by any number of access points such as AP 110. The AP 110 is assigned a unique MAC address that is programmed therein by, for example, the manufacturer of the access point. Similarly, each of STA1-STA4 is also assigned a unique MAC address.

The stations STA1-STA4 may be any suitable Wi-Fi enabled wireless devices including, for example, cell phones, personal digital assistants (PDAs), tablet devices, laptop computers, or the like. For at least some embodiments, stations STA1-STA4 may include a transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6A-6C.

The AP 110 may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, AP 110 may include a transceiver, a network interface, one or more processing resources, and one or more memory sources. The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 6A-6C.

For purposes of discussion herein, STA1 is not associated with AP 110, and STA2-STA4 are associated with AP 110. Thus, while STA2-STA4 have an established communication link with AP 110 and currently share the wireless medium (not shown for simplicity) associated with AP 110, STA1 does not have an established communication link with AP 110 and therefore does not currently share the wireless medium associated with AP 110. As a result, STA1 may seek to join WLAN 120 and/or associate with AP 110, and may hereinafter be referred to as the "new" STA. It is to be noted without loss of generality that the present embodiments may be applied to a scenario where STA1 is already associated to an AP but is trying to decide between using WLAN or an alternate network interface; or make a roaming decision to another AP, among others.

Figure 2:
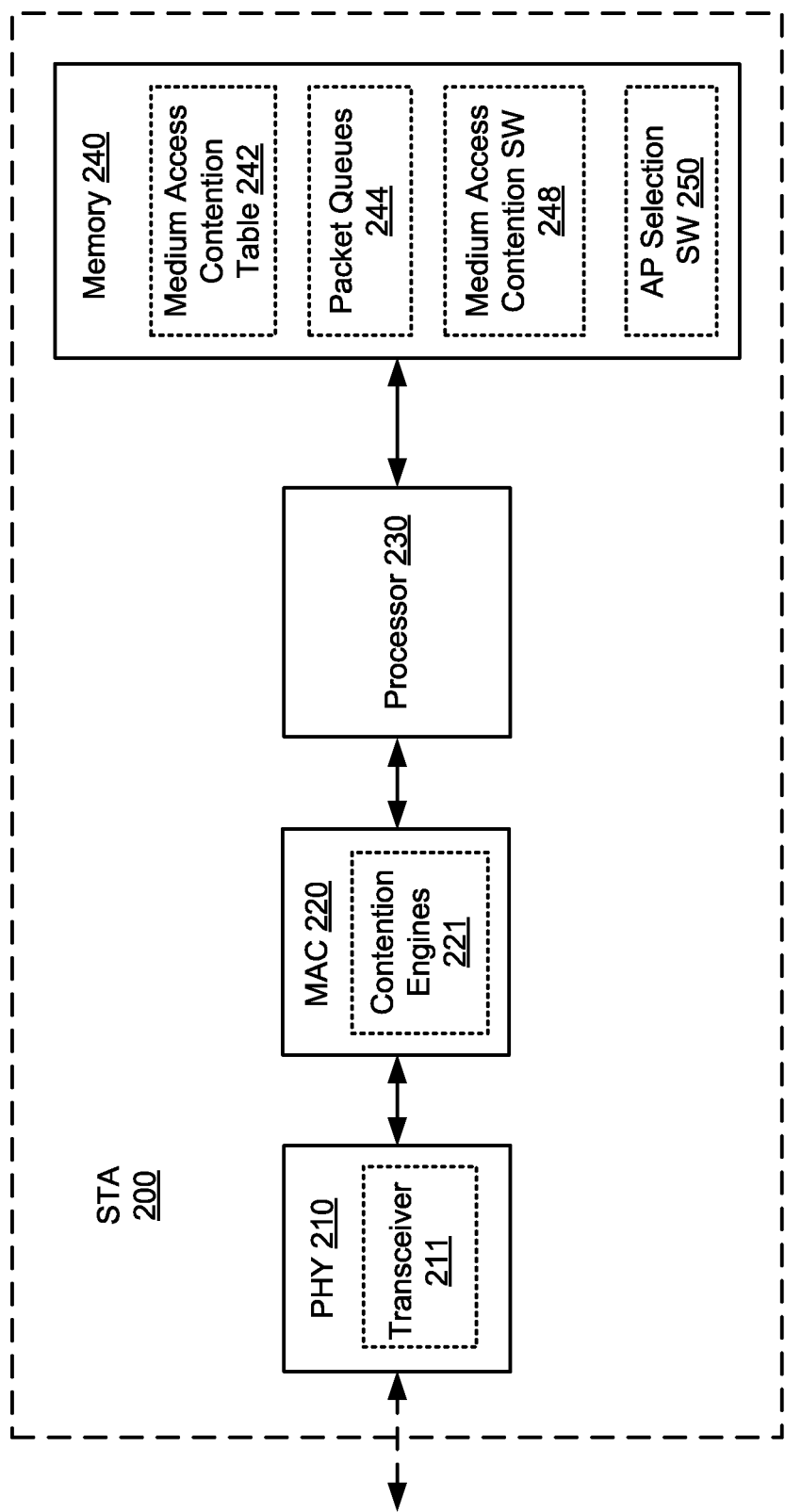
FIG. 2 shows a block diagram of a wireless station (STA) in accordance with some embodiments.

FIG. 2 shows a STA 200 that is one embodiment of at least one of the stations STA1-STA4 of FIG. 1. The STA 200 may include a PHY device 210 including at least a WLAN transceiver 211, a MAC device 220 including a number of contention engines 221, a processor 230, and a memory 240. The transceiver 211 may be used to transmit signals to and receive signals from AP 110 (see also FIG. 1), and may be used to scan the surrounding environment to detect and identify nearby access points (e.g., access points within range of STA 200). For purposes of discussion herein, MAC device 220 is shown in FIG. 2 as being coupled between PHY device 210 and processor 230. For actual embodiments, PHY device 210, MAC device 220, processor 230, and/or memory 240 may be connected together using one or more buses (not shown for simplicity).

The contention engines 221 may contend for access to the shared wireless medium, and may also store packets for transmission over the shared wireless medium. The STA 200 may include one or more contention engines 221 for each of the plurality of different access categories. For other embodiments, the contention engines 221 may be separate from MAC device 220. For still other embodiments, the contention engines 221 may be implemented as one or more software modules (e.g., stored in memory 240 or stored in memory provided within MAC device 220) containing instructions that, when executed by processor 230, perform the functions of contention engines 221.

Memory 240 may include a medium access parameters table 242 that may store a number of medium access parameters including, for example, transmission schedules, contention windows, contention window sizes, back-off periods, random back-off numbers, and/or other information associated with contending for and/or controlling access to the wireless medium of the WLAN 120 of FIG. 1. Memory 240 may include a number of packet queues 244. The packet queues 244 may store packets to be transmitted from STA 200 to an associated AP (or other STAs). For some embodiments, the memory 240 may include one or more packet queues 244 for each of a plurality of different priority levels or access categories, for example, as described in more detail below with respect to FIG. 4.

Memory 240 may also include a non-transitory computer-readable medium (e.g., one or more nonvolatile memory elements, such as EPROM, EEPROM, Flash memory, a hard drive, and so on) that can store the following software modules:
- a medium access contention software module 248 to contend for, to control, and/or to relinquish access to wireless mediums such as the wireless medium associated with AP 110 of FIG. 1; and
- an AP selection software module 250 to select one of a number of nearby APs with which to associate.

Each software module includes instructions that, when executed by processor 230, cause STA 200 to perform the corresponding functions. The non-transitory computer-readable medium of memory 240 thus includes instructions for performing all or a portion of the STA-side operations of the method of FIGS. 6A-6C.

Processor 230, which is shown in the example of FIG. 2 as coupled to PHY device 210 and transceiver 211, to MAC device 220 and contention engines 221, and to memory 240, may be any suitable processor capable of executing scripts or instructions of one or more software programs stored in STA 200 (e.g., within memory 240). For example, processor 230 may execute medium access contention software module 248 to contend for, to control, and/or to relinquish access to a wireless medium. Processor 230 may also execute AP selection software module 250 to select one of a number of nearby APs with which to associate.

Figure 3:
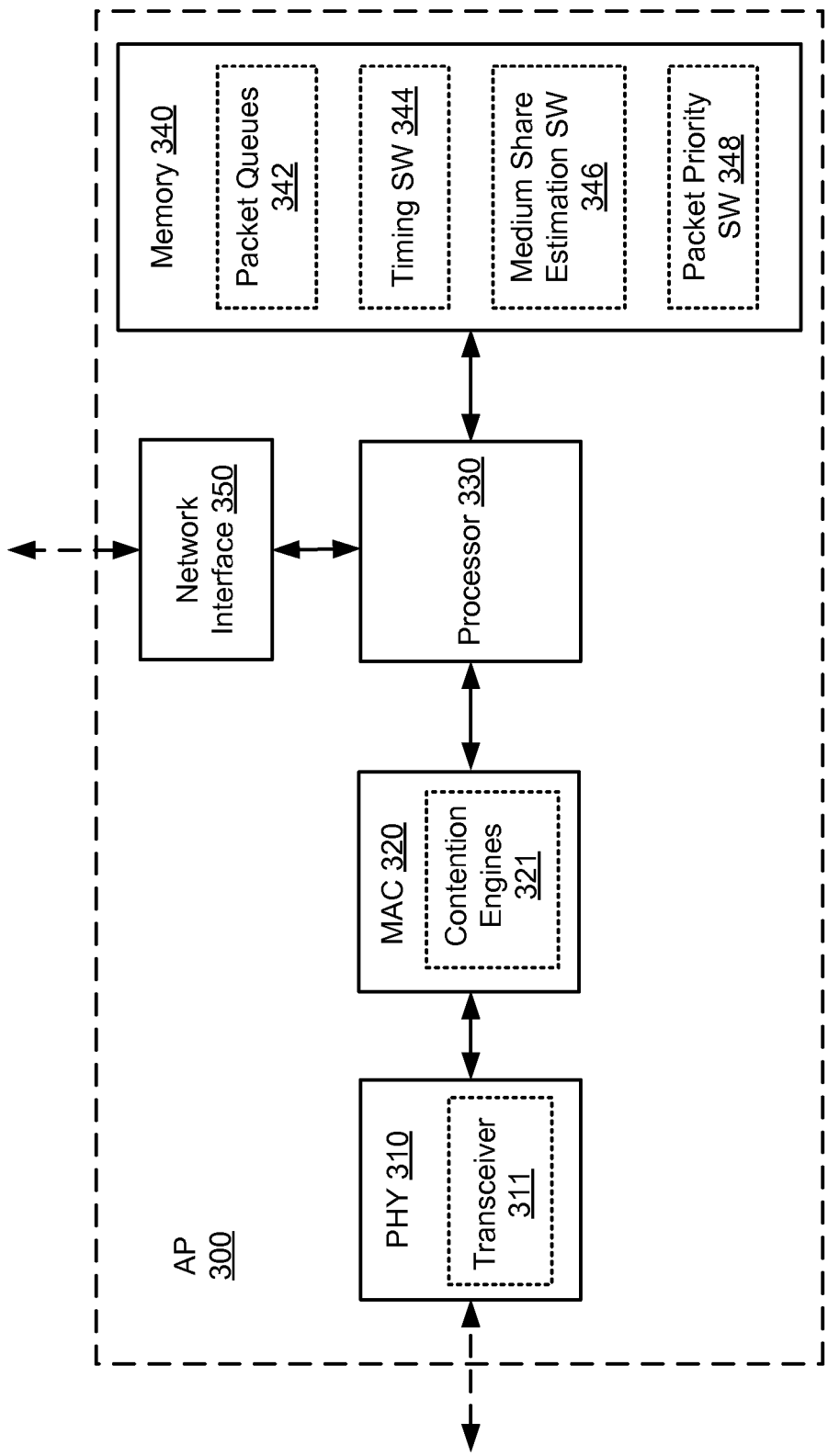
FIG. 3 shows a block diagram of an access point (AP) in accordance with some embodiments.

FIG. 3 shows an example of an AP 300 that is one embodiment of AP 110 of FIG. 1. AP 300 includes a PHY device 310 including at least a transceiver 311, a MAC device 320 including at least a number of contention engines 321, a processor 330, a memory 340, and a network interface 350. The transceiver 311 may be used to communicate wirelessly with one or more STAs, with one or more other APs, and/or with other suitable devices. The network interface 350 may be used to communicate with a WLAN server (not shown for simplicity) associated with WLAN 120 of FIG. 1 either directly or via one or more intervening networks and to transmit signals. Processor 330, which is coupled to PHY device 310 and transceiver 311, to MAC device 320 and contention engines 321, to memory 340, and to network interface 350, may be any suitable processor capable of executing scripts or instructions of one or more software programs stored in AP 300 (e.g., within memory 340). For purposes of discussion herein, MAC device 320 is shown in FIG. 3 as being coupled between PHY device 310 and processor 330. For actual embodiments, PHY device 310, MAC device 320, processor 330, memory 340, and/or network interface 350 may be connected together using one or more buses (not shown for simplicity).

The contention engines 321 may contend for access to the shared wireless medium, and may also store packets for transmission over the shared wireless medium. For some embodiments, AP 300 may include one or more contention engines 321 for each of the plurality of different access categories, for example, as described in more detail below with respect to FIG. 4A. For other embodiments, the contention engines 321 may be separate from MAC device 320. For still other embodiments, the contention engines 321 may be implemented as one or more software modules (e.g., stored in memory 340 or within memory provided within MAC device 320) containing instructions that, when executed by processor 330, perform the functions of contention engines 321 described below.

Memory 340 may include a number of packet queues 342. The packet queues 342 may store packets to be transmitted from AP 300 to one or more STAs. For some embodiments, the memory 340 may include one or more packet queues 342 for each of a plurality of different priority levels or access categories, for example, as described in more detail below with respect to FIG. 4. In addition, for at least some embodiments, memory 340 may include packet queues for a plurality of different destinations (e.g., STAs), for example, as described in more detail below with respect to FIG. 4.

Figure 6A:
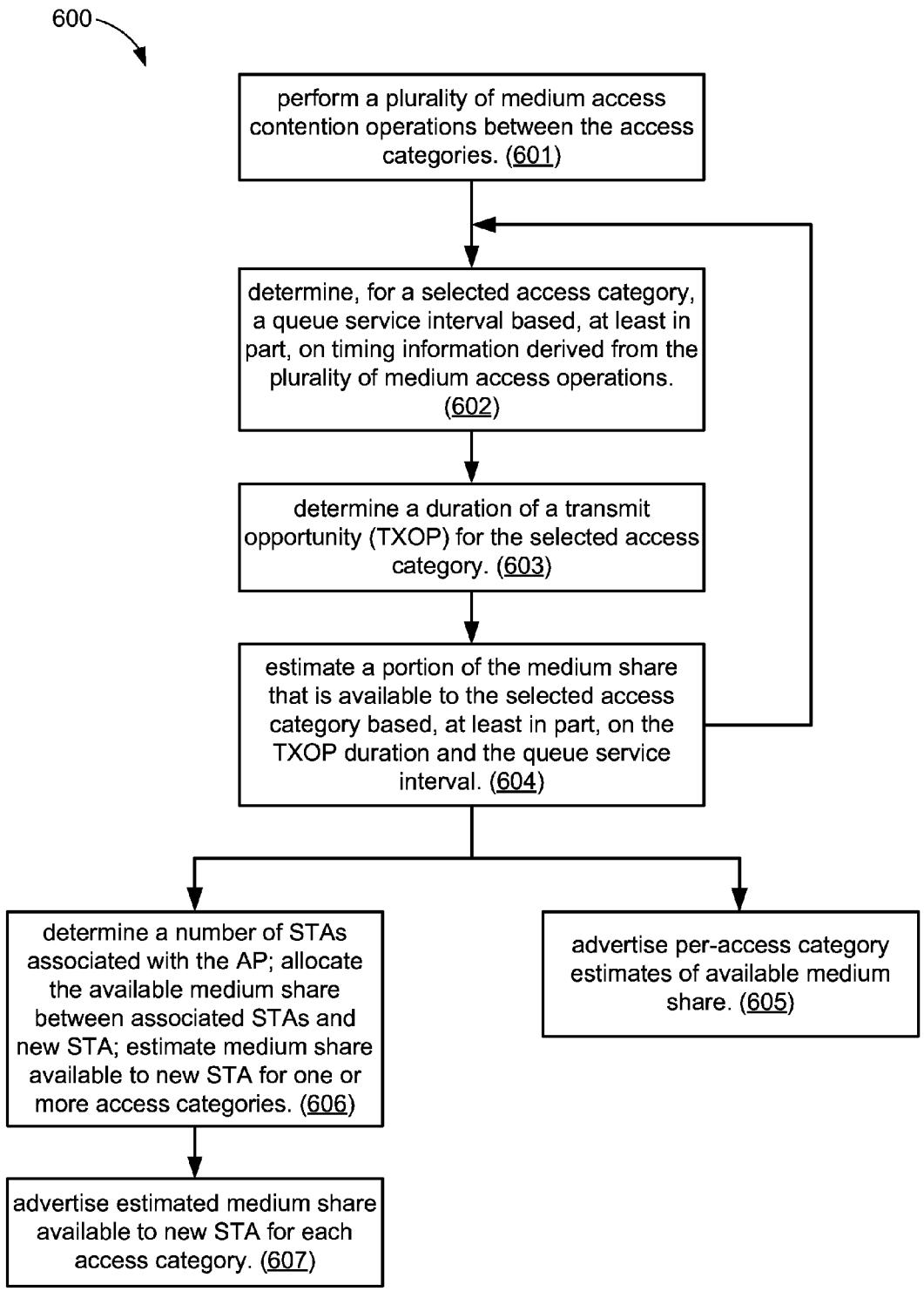
FIGS. 6A-6C show illustrative flow charts depicting example operations for estimating the available capacity of an AP in accordance with some embodiments.
Figure 6B:
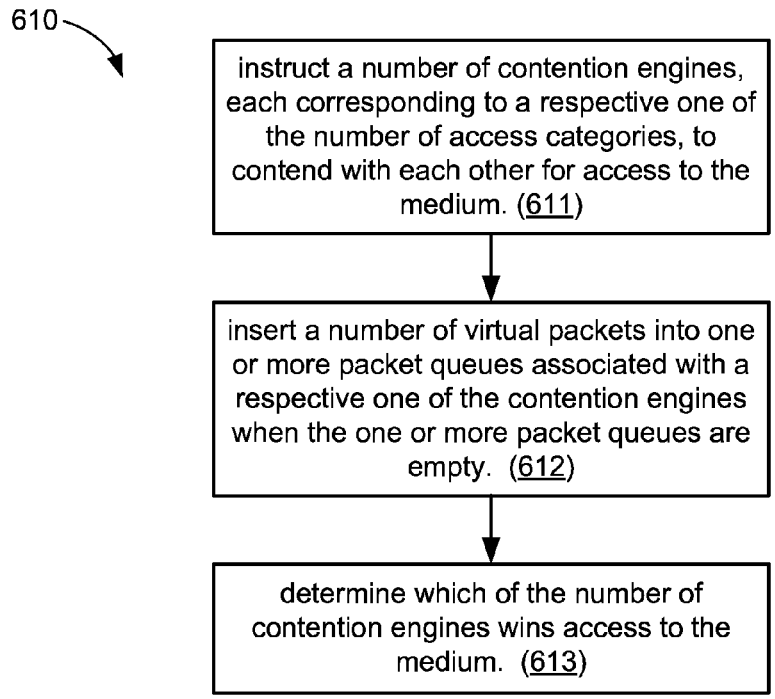
Figure 6C:
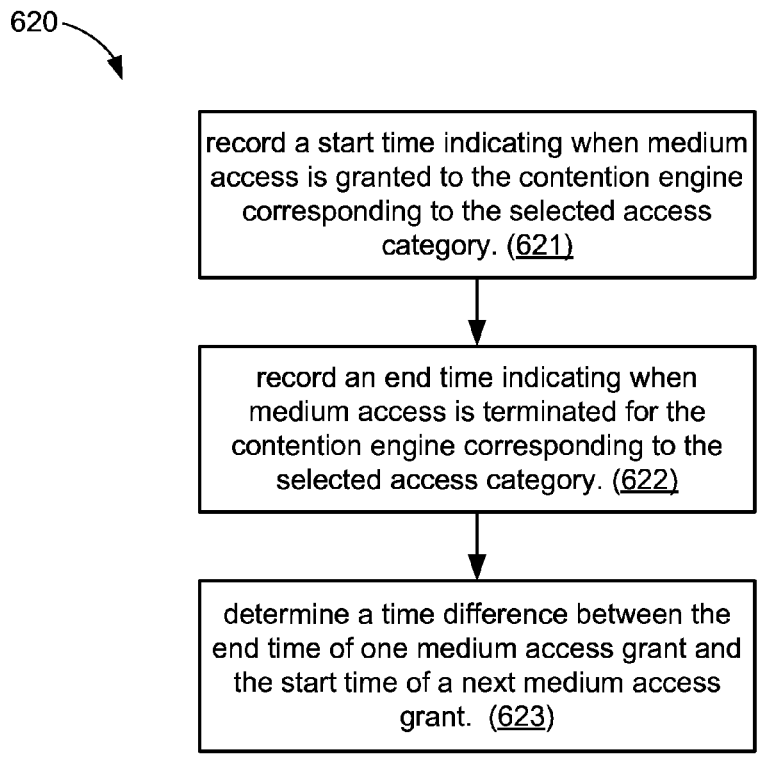

Memory 340 may also include a non-transitory computer-readable medium (e.g., one or more nonvolatile memory elements, such as EPROM, EEPROM, Flash memory, a hard drive, and so on) that can store the following software modules:
- a timing software module 344 to derive timing information (e.g., TXOP durations, service intervals, start and end times of medium access grants, and so on) from a plurality of medium access contention operations (e.g., as described for operations 602, 603, and 621-623 of FIGS. 6A-6C);
- a medium share estimation software module 346 to estimate the medium share available to the STA seeking to associate with the AP 300 .g., as described for operations 604 and 606 of FIGS. 6A-6C); and
- a packet priority software module 348 to determine the priority level or access category for actual packets and/or for virtual packets.

Each software module includes instructions that, when executed by processor 330, cause AP 300 to perform the corresponding functions. The non-transitory computer-readable medium of memory 340 thus includes instructions for performing all or a portion of the AP-side operations of the methods of FIGS. 6A-6C.

Processor 330, which is shown in the example of FIG. 3 as coupled to transceiver 311 of PHY device 310 via MAC device 320, to memory 340, and to network interface 350, may be any suitable processor capable of executing scripts or instructions of one or more software programs stored in AP 300 (e.g., within memory 340). For example, processor 330 may execute timing software module 344 to derive timing information (e.g., TXOP durations, service intervals, start and end times of medium access grants, and so on) from a plurality of medium access contention operations. Processor 330 may also execute medium share estimation software module 346 to estimate the medium share available to the STA seeking to associate with the AP 300, to estimate the medium share available for each of the access categories, and/or to estimate the medium share available for each user (e.g., each STA). Processor 330 may also execute packet priority software module 348 to determine the priority level or access category for actual packets and/or virtual packets.

Figure 4:
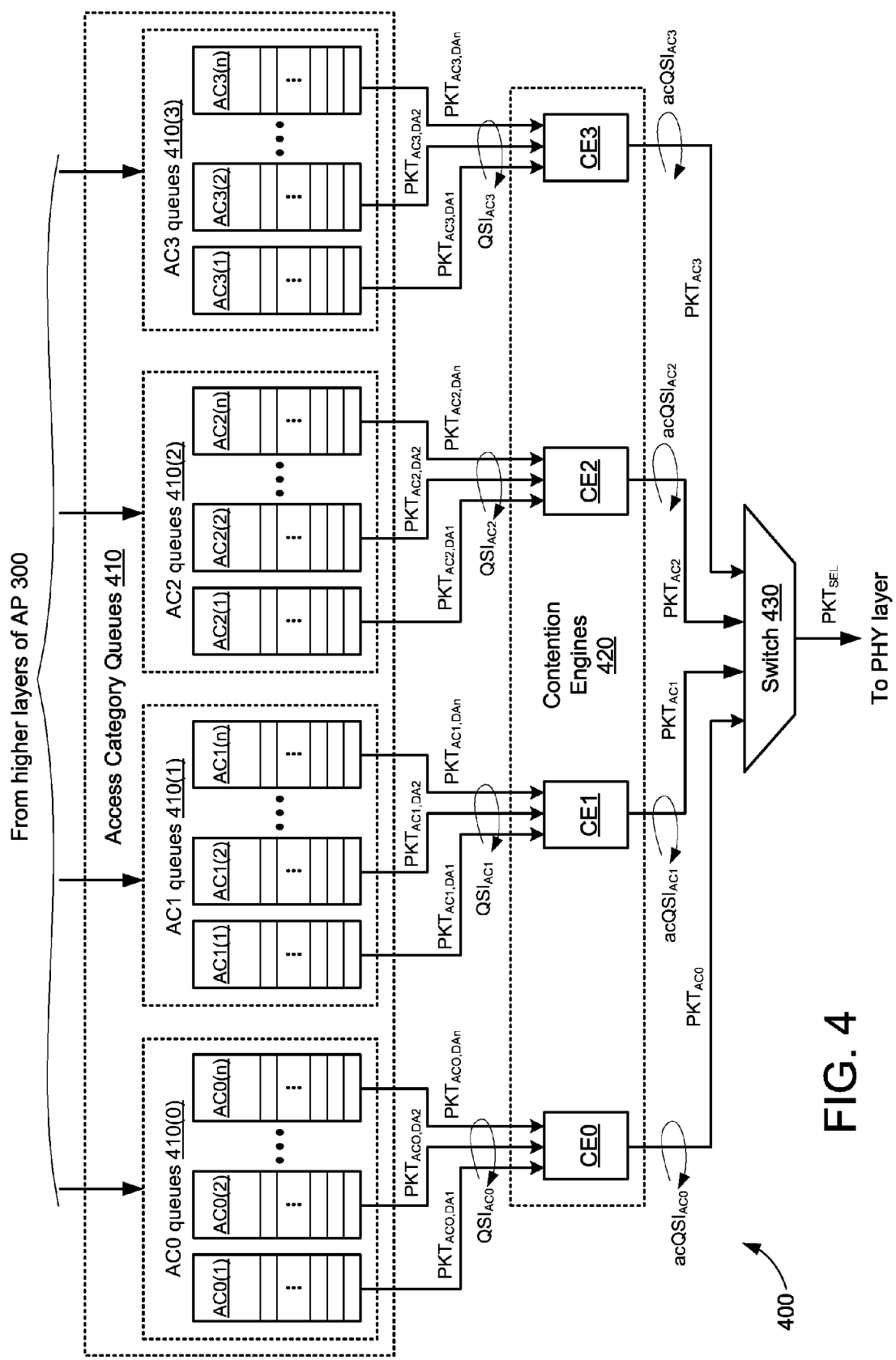
FIG. 4 shows a block diagram of a packet contention and transmission system of the AP of FIG. 3 in accordance with some embodiments.

FIG. 4 depicts a packet contention and transmission system 400 of the AP 300 of FIG. 3. For some embodiments, the system 400 may be implemented by or correspond to MAC device 320, processor 330, and/or memory 340 of FIG. 3. For other embodiments, the system 400 may be a separate device or chip coupled to PHY device 310, MAC device 320, processor 330, and memory 340 of FIG. 3. The system 400 is shown to include access category queues 410, contention engines 420, and a switch 430. The access category queues 410, which may be one embodiment of the packet queues 342 of FIG. 3, includes four sets of AC packet queues 410(0)-410(3) that may receive data packets from an upper layer (not shown for simplicity) of the AP 300 (e.g., after packet classification operations that determine the TID and DA of downlink data to be queued in the access category queues 410).

The first set of packet queues 410(0) is to queue downlink data classified by a TID corresponding to the first access category (AC0), and includes a plurality of individual packet queues AC0(1)-AC0(n) each for storing packets to be transmitted to a corresponding one of a plurality of destination addresses DA1-DAn. The second set of packet queues 410(1) is to queue downlink data classified by a TID corresponding to the second access category (AC1), and includes a plurality of individual packet queues AC1(1)-AC1(n) each for storing packets to be transmitted to a corresponding one of the plurality of destination addresses DA1-DAn. The third set of packet queues 410(2) is to queue downlink data classified by a TID corresponding to the third access category (AC2), and includes a plurality of individual packet queues AC2(1)-AC2(n) each for storing packets to be transmitted to a corresponding one of the plurality of the destination addresses DA1-DAn. The fourth set of packet queues 410(3) is to queue downlink data classified by a TID corresponding to the fourth access category (AC3), and includes a plurality of individual packet queues AC3(1)-AC3(n) each for storing packets to be transmitted to a corresponding one of the plurality of destination addresses DA1-Dn.

As noted above, each of the destination addresses DA1-DAn identifies a corresponding STA to which the AP 300 may transmit data. For purposes of discussion herein, ST1 has a destination address of DA1, STA2 has a destination address of DA2, STA3 has a destination address of DA3, and STA4 has a destination address of D4. Thus, for the first access category AC0, packet queue AC0(1) may store packets to be delivered to STA1, packet queue AC0(2) may store packets to be delivered to STA2, and so on; for the second access category AC1, packet queue AC1(1) may store packets to be delivered to STA1, packet queue AC1(2) may store packets to be delivered to STA2, and so on; for the third access category, packet queue AC2(1) may store packets to be delivered to STA1, packet queue AC2(2) may store packets to be delivered to STA2, and so on; for the fourth access category AC3, packet queue AC3(1) may store packets to be delivered to STA1, packet queue AC3(2) may store packets to be delivered to STA2, and so on. Thus, each set of access category queues 410(0)-410(3) may queue downlink data on a per-user basis.

The contention engines 420, which may be one embodiment of contention engines 321 of FIG. 3, are shown to include four individual contention engines CE0-CE3. The first contention engine CE0 includes an input to receive packets from the first set of packet queues 410(0), includes an output coupled to switch 430, and is to contend for medium access on behalf of the first access category AC0. The second contention engine CE1 includes an input to receive packets from the second set of packet queues 410(1), includes an output coupled to switch 430, and is to contend for medium access on behalf of the second access category AC1. The third contention engine CE2 includes an input to receive packets from the third set of packet queues 410(2), includes an output coupled to switch 430, and is to contend for medium access on behalf of the third access category AC2. The fourth contention engine CE3 includes an input to receive packets from the fourth set of packet queues 410(3), includes an output coupled to switch 430, and is to contend for medium access on behalf of the fourth access category AC3. Thus, each of contention engines CE0-CE3 may queue downlink data on a per-AC basis.

Each of the contention engines CE0-CE3 is responsible for contending for medium access for its corresponding access category. To ensure that access categories associated with higher data priority levels are granted medium access faster and/or more frequently than access categories associated with lower data priority levels, the contention engines CE0-CE3 may select from different ranges of contention period back-off values. More specifically, the contention engines associated with higher priority access categories select from a lower range of back-off values than the contention engines associated with lower priority access categories. In this manner, contention engines associated with higher priority access categories may have a greater chance of winning medium access for any given contention period than contention engines associated with lower priority access categories. Thus, for the present embodiments, contention engine CE0 may select from the lowest range of back-off values, contention engine CE1 may select from the second lowest range of back-off values, contention engine CE2 may select from the third lowest range of back-off values, and contention engine CE3 may select from the highest range of back-off values. For at least some embodiments, the numerical ranges from which the contention engines CE0-CE3 select back-off values overlap one another.

The switch 430 includes inputs to receive packets from contention engines CE0-CE3, and an output coupled to a PHY layer (e.g., transceiver 311 of FIG. 3) of AP 300. In operation, the switch 430 forwards one of the packets $PKT_{AC0}$-$PKT_{AC3}$ provided from respective contention engines CE0-CE3 as the selected packet ($PKT_{SEL}$) to the PHY layer, which in turn transmits $PKT_{SEL}$ on the wireless medium. More specifically, the one of contention engines CE0-CE3 that wins medium access for a given contention period forwards the corresponding one of $PKT_{AC0}$-$PKT_{AC3}$ as $PKT_{SEL}$ to be transmitted onto the wireless medium.

For some embodiments, the contention and transmission system (not shown for simplicity) of the STA 200 of FIG. 2 may be similar to the contention and transmission system 400 of FIG. 4, except that in the STA 200 there may be only one queue for each of access categories AC0-AC3 (e.g., because the STA typically transmits data only to an associated AP, and thus there is only one DA value for uplink data queued in the STA). For other embodiments, the contention and transmission system of the STA 200 of FIG. 2 may include separate DA packet queues for each access category, which may allow the STA to support transmission of traffic for multiple DAs.

In accordance with the present embodiments, the AP 300 may sample contention period times of the contention engines CE0-CE3 and/or scheduling times (e.g., based on round-robin or other suitable techniques) for the packet queues associated with each of the access categories AC0-AC3 to estimate the available capacity of the AP (e.g., for a new STA). For at least some embodiments, per-access category estimates of available medium share may determine the service interval of equation (1) using access category TXOP durations and access category queue service intervals (acQSI), as described in more detail below. Further, for at least some embodiments, per-user estimates of available medium share may determine the service interval of equation (1) using access category TXOP durations, the acQSIs, and the per-user queue service interval (QSI), as described in more detail below.

As noted above, during each contention period, each of contention engines CE0-CE3 contends for medium access. The contention engine that wins medium access for a given contention period is granted a TXOP during which the winning contention engine may transmit one or more packets belonging to the corresponding AC onto the wireless medium. The winning contention engine may serve its corresponding packet queues 410 in a round-robin manner. When the TXOP ends, the winning contention engine relinquishes control of the medium, and may subsequently resume serving its corresponding packet queues 410 during its next TXOP (e.g., corresponding to the next contention period win). For example, suppose contention engine CE0 wins medium access during a first contention period and is granted a first TXOP. During the first TXOP, contention engine CE0 may initially serve its first packet queue AC0(1) by transmitting data stored in packet queue AC0(1) onto the medium. When the first TXOP ends, contention engine CE0 relinquishes control of the medium, and another contention period begins. Upon the next contention period win for contention engine CE0 (e.g., which may occur after zero or more of the other contention engines CE1-CE3 wins contention periods and are granted TXOPs), contention engine CE0 is granted a second TXOP and may serve its second packet queue AC0(2) by transmitting data stored in packet queue AC0(2) onto the medium. The contention engine CE0 may continue to serve its individual packet queues AC0(1)-AC0($n$) forming the AC0 queues 410(0) in a round-robin manner, for example, to ensure that the individual queues AC0(1)-AC0($n$) associated with the first access category AC0 are granted equal access to the medium.

The period of time associated with each of the individual packet queues of a corresponding set of AC queues 410 being served once is referred to herein as the queue service interval (QSI), as indicated in FIG. 4. More specifically, the value of QSI may be defined, for at least one embodiment, as the period of time between the completion of service for a given packet queue of the corresponding access category and the commencement of the next service of the given packet queue. This period of time includes the time taken to serve the other packet queues of the corresponding access category before returning to the given packet queue. Thus, the value of QSI may be a metric of the period of time between successive services of a given user's traffic belonging to a specific access category.

For example, the value of $QSI_{AC0}$ denotes the amount of time for contention engine CE0 to serve all of its corresponding packet queues AC0(1)-AC0($n$) one time in a round-robin manner, the value of $QSI_{AC1}$ denotes the amount of time for contention engine CE1 to serve all of its corresponding packet queues AC1(1)-AC1($n$) one time in a round-robin manner, the value of $QSI_{AC2}$ denotes the amount of time for contention engine CE2 to serve all of its corresponding packet queues AC2(1)-AC2($n$) one time in a round-robin manner, and the value of $QSI_{AC3}$ denotes the amount of time for contention engine CE3 to serve all of its corresponding packet queues AC3(1)-AC3($n$) one time in a round-robin manner.

The period of time between successive grants of medium access for a given one of the contention engines CE0-CE3 is referred to herein as the access category's queue service interval (acQSI), as indicated in FIG. 4. More specifically, the value of acQSI may be defined, for at least one embodiment, as the amount of time that a contention engine of a given access category waits between successive grants of medium access. Thus, the value of acQSI may account for the amount of time that a packet of the given access category spends contending with packets of other access categories and with other users of the medium.

For example, the value of $acQSI_{AC0}$ may denote the amount of time between the end of one medium access grant for contention engine CE0 and the beginning of the next medium access grant for contention engine CE0, the value of $acQSI_{AC1}$ may denote the amount of time between the end of one medium access grant for contention engine CE1 and the beginning of the next medium access grant for contention engine CE1, the value of $acQSI_{AC2}$ may denote the amount of time between the end of one medium access grant for contention engine CE2 and the beginning of the next medium access grant for contention engine CE2, and the value of $acQSI_{AC3}$ may denote the amount of time between the end of one medium access grant for contention engine CE3 and the beginning of the next medium access grant for contention engine CE3.

For some embodiments, the AP 300 may include one or more clocks, counters, timers, or other suitable circuits or logic to record a start time and an end time of each medium access grant to the contention engines CE0-CE3. The start times and end times may be used to determine values for $acQSI_{AC0}$, $acQSI_{AC1}$, $acQSI_{AC2}$, and/or $acQSI_{AC3}$. Time values for $QSI_{AC0}$, $QSI_{AC1}$, $QSI_{AC2}$, and/or $QSI_{AC3}$ may be determined in a similar manner.

It is noted that, assuming equal priority between queued downlink data of a given access category for different users and assuming round-robin scheduling between the individual packet queues for the given access category, the given access category may be associated with one pair of QSI and acQSI values. Thus, in accordance with some embodiments, a portion of the AP's medium share that is available for a selected access category may be expressed as:

$$\text{MS\_AC} = \frac{TXOP}{TXOP + acQSI}. \quad (2)$$

where the sum of the TXOP duration for the selected access category and the value of acQSI may denote the expected service interval. Further, in accordance with some embodiments, a portion of the AP's medium share that is available for a given user (e.g., for a STA having a given destination address DA) for the selected access category may be expressed as:

$$\text{MS\_newuser} = \frac{TXOP}{TXOP + acQSI + QSI}. \quad (3)$$

where the sum of the TXOP duration for the selected access category, the value of acQSI, and the value of QSI may denote the expected service interval.

Additionally or alternatively to equation (3), the AP 300 may compute the portion of the AP's medium share available to the new STA by first obtaining the medium share available for the access category of the new STA, for example from equation (2), and then evaluating the distribution of this medium share between its currently associated STAs and the new STA. The AP 300 may evaluate the distribution of the available medium share, for a selected access category, between its currently associated STAs and a new STA using information indicating the associated STAs' medium utilizations and scheduling policies. Thus, assuming round-robin servicing of the access category's individual packet queues, and recognizing that the medium utilizations of the currently associated STAs may decrease in the presence of the new STA, the new STA's full buffer medium utilization, denoted as "$MS_{newuser}$," may be determined from the per-AC medium share and information indicating the number of users and/or an amount of the medium share that each of the users utilizes. For one example, if all users have full buffer traffic and use their allocated fair shares of the medium, then the per-user medium share may be determined by dividing the per-AC medium share by the number of users plus one (e.g., where the plus one corresponds to the new STA). For another example, if one or more users do not have full buffer traffic or do not use their allocated fair shares of the medium, then the per-user medium share may be determined by re-distributing the excess per-AC medium share (e.g., corresponding to unused medium share by the one or more users) to the remaining users (e.g., users that have full buffer traffic), and then re-computing the fair share for the remaining users.

The determination of the value of acQSI for a given access category may depend upon the given access category having traffic to send onto the medium. Thus, for some embodiments, when the given access category does not have traffic to send, the AP 300 may attempt to transmit a short measurement packet to measure the value of acQSI for the given access category. The measurement packet may be a QoS null-frame, a CTS-to-self frame, or any other suitable frame transmitted by the AP 300 and ignored by the associated STAs in the network. The measurement packet may be as small as possible.

When the AP 300 does not have queued downlink data for multiple access categories at a given instant of time, the AP 300 may stagger the measurement of acQSI for its various access categories to ensure that a measurement packet is available for transmission from only one access category at time, thereby preventing measurement packets from multiple access categories from simultaneously contending with each other for medium access. For some embodiments, the AP 300 may replace the measurement packet with a virtual packet: the virtual packet may be queued in the AC packet queues 410 for medium access contention operations (e.g., to determine the values of acQSI and/or QSI) but not actually transmitted onto the medium. For at least some embodiments, each virtual packet may have a transmit duration equal to the TXOP for its access category (although the virtual packets may be of other lengths corresponding to longer transmit durations). For such embodiments, the value of acQSI for a given access category may indicate the amount of time that the given access category would have taken to contend for the medium if the given access category had packets to send.

More specifically, if one or more of the packet queues in the sets of queues 410 are empty (e.g., there are no packets to send), then the AP 300 may insert a number of virtual packets into the empty packet queues to estimate what the available medium share would be under a full load condition. The virtual packets may allow the otherwise empty packet queues to contend with the non-empty packet queues for medium access, for example, to allow for contention period measurements and TXOP scheduling for full-load conditions. In this manner, values of acQSI for all the access categories may be determined for full-load conditions even when one or more of the packet queues are empty. Once the values of acQSI for all the access categories are determined, there is no need to send the virtual packets onto the medium.

It is noted that because the virtual packets contend for medium access but are not actually transmitted onto the medium, the virtual packets may be trumped by actual packets to be transmitted onto the medium. Accordingly, the value of acQSI for a given access category obtained when an actual packet of the same AC "collides" with a virtual packet is ignored because the value of acQSI based on the actual packet is likely to be longer than the value of acQSI based on the virtual packet. Further, although virtual packets may contend for medium access only when the medium has been idle for a DIFS period, virtual packets from multiple access categories may be granted "virtual" TXOPs at the same time (e.g., because the virtual packets are not actually transmitted onto the medium).

Figure 5:
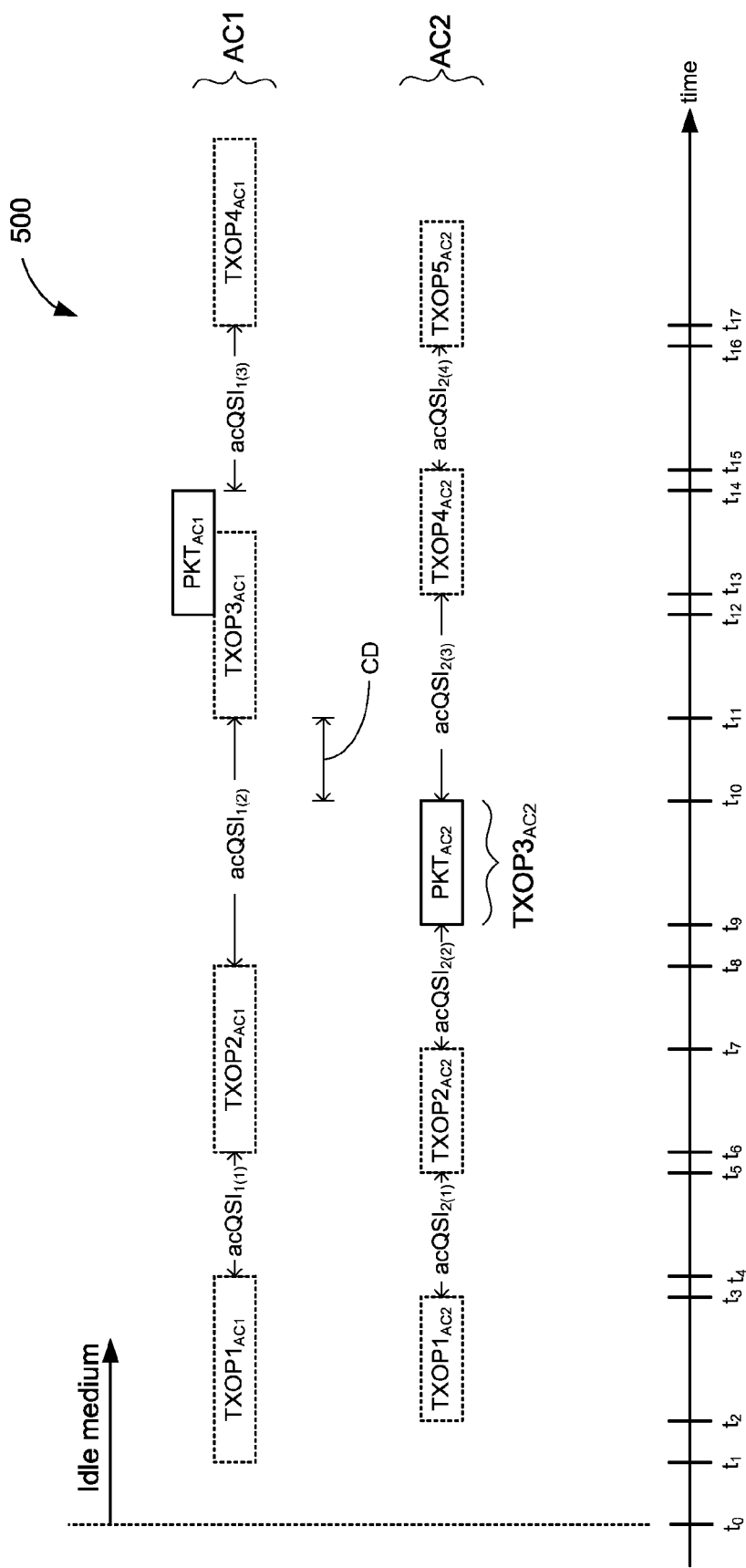
FIG. 5 shows a sequence diagram depicting an example scheduling of transmit opportunities for two access categories in accordance with some embodiments.

FIG. 5 is a sequence diagram 500 depicting an example scheduling of TXOPs for access categories AC1 and AC2 (for simplicity, TXOPs for other access categories AC0 and AC3 are not shown in FIG. 5). At time $t_0$, the medium becomes idle and the contention engines CE1 and CE2 contend for medium access. At time $t_1$, contention engine CE1 wins the contention period and is granted a transmit opportunity $TXOP1_{AC1}$ for an AC1 virtual packet. At time $t_2$, contention engine CE2 wins the contention period and is granted a transmit opportunity $TXOP1_{AC2}$ for an AC2 virtual packet. The $TXOP1_{AC2}$ ends at time $t_3$, and the $TXOP1_{AC1}$ ends at time $t_4$.

Note that the TXOPs for virtual packets are depicted in dashed boxes in FIG. 5 to indicate that the virtual packets are scheduled for transmission during corresponding TXOPs, but are not actually transmitted from the AP 300.

At time $t_5$, contention engine CE2 wins the contention period and is granted a transmit opportunity $TXOP2_{AC2}$ for another AC2 virtual packet. The time period between times $t_3$ and $t_5$ is denoted as a first sample of $acQSI_2$ for AC2. At time $t_6$, contention engine CE1 wins the contention period and is granted a transmit opportunity $TXOP2_{AC2}$ for another AC1 virtual packet. The time period between times $t_4$ and $t_6$ is denoted as a first sample of $acQSI_1$ for AC1. The $TXOP2_{AC2}$ ends at time $t_7$, and the $TXOP2_{AC1}$ ends at time $t_8$.

At time $t_9$, contention engine CE2 wins the contention period and is granted a transmit opportunity $TXCP3_{AC2}$ for an actual packet ($PKT_{AC2}$). The duration of the time period between $t_7$ and $t_9$ gives another sample of $acQSI_2$. The TXOP for $PKT_{AC2}$ ends at time $t_{10}$. After a time period that is noted as the next sample of $acQSI_2$, contention engine CE2 is granted a transmit opportunity $TXOP4_{AC2}$ for another AC2 virtual packet. The $TXOP4_{AC2}$ ends at time $t_{15}$, and after a time period that is noted as the next sample of $acQSI_2$, contention engine CE2 is granted a transmit opportunity $TXOP5_{AC2}$ for another AC2 virtual packet at time $t_{16}$.

At time $t_{11}$, contention engine CE1 wins the contention period and is granted a transmit opportunity $TXOP3_{AC1}$ for another AC1 virtual packet. The duration of time between times $t_{10}$ and $t_{11}$ corresponds to a contention delay (CD), which for some embodiments may be equal to an AIFS duration plus a random back-off period. The duration of the time period between $t_8$ and $t_{11}$ gives another sample of $acQSI_1$. At time $t_{12}$, which occurs during $TXOP3_{AC1}$, contention engine CE1 transmits an actual packet ($PKT_{AC1}$) onto the medium. Because $PKT_{AC1}$ is an actual packet, $PKT_{AC1}$ trumps the virtual packet and may use the $TXOP3_{AC1}$ that was originally granted to the virtual packet. Transmission of $PKT_{AC1}$ ends at time $t_{14}$, and after a time period that is noted as the next sample of $acQSI_1$, contention engine CE1 is granted a transmit opportunity $TXOP4_{AC1}$ for another virtual packet at time $t_{17}$.

It is noted that although the transmit opportunities (TXOPs) for the virtual packets may be depicted in FIG. 5 as having similar durations, in practice the various TXOPs may be of various durations (e.g., depending at least in part upon which access category each of the virtual packets belongs to). Similarly, although the transmit durations associated with the actual packets PKTs may be depicted in FIG. 5 as being of similar lengths, in practice the transmit durations associated with the actual packets may be different.

The AP 300 may provide the estimates of available medium share to the new STA in any suitable manner. For at least some embodiments, the AP 300 may include the available medium share estimates in information elements (IEs) contained within beacon frames broadcast from the AP 300 (e.g., at one or more TBTTs). For other embodiments, the AP 300 may include the available medium share estimates in IEs contained within probe response frames sent to the new STA (e.g., in response to probe requests sent by the new STA). For another embodiment, the estimates of available medium share may be provided within access network query protocol (ANQP) messaging elements. For other embodiments, the estimates of available medium share may be provided in association frames, authentication frames, management frames, and/or any other type of frames. For yet another embodiment, the estimates of available medium share may be scaled and provided in the available admission capacity field of the BSS load element specified by the IEEE 802.11 standards.

The AP 300 may determine and advertise other metrics that are equivalent or related to the maximum medium utilization available to a new STA. These other metrics may include, but are not limited to: the current medium utilization of each STA along with the projected available medium share for the new STA; the total medium available for the selected AC after adding the new STA's traffic; downlink throughput estimates for the new STA for a specific physical layer rate; bounds on the medium utilization available; inter-service time, jitter in the service, and other related metrics; medium utilization computed at different time-scales of averaging; and any combination of the above metrics.

The embodiments described above assume that the DA packet queues (e.g., queues AC0(1)-AC0(n) of queue set 410(0)) all have the same priority. For other embodiments, the AP 300 may prioritize the traffic of different DA queues within a given access category differently. For example, referring to the set of AC0 queues 410(0), packet queues AC0(1) and AC0(2) may be assigned a higher priority than packet queues AC0(3) through AC0(n). As a result, access category AC0 may now include two reference queues: one selected from the set of higher priority users (e.g., either packet queue AC0(1) or AC0(2)), and another selected from the set of lower priority users (e.g., one of packet queues AC0(3) through AC0(n)). Thus, access category AC0 may also be associated with two QSI values: a first QSI value for packet queues AC0(1) and AC0(2), and a second QSI value for packet queues AC0(3) through AC0(n). Accordingly, multiple priority levels and multiple QSI values may be defined within the same access category.

It is noted that AP 300 may determine the TXOP duration differently depending upon the AP's transmit scheduling policy. For one embodiment, the AP 300 may allocate each TXOP to traffic destined to a single STA or DA, and thus may terminate the TXOP early if there is no more traffic to send to the DA during the TXOP. For this embodiment, the upper-bound on the medium time granted is equal to the TXOP for the corresponding access category. For another embodiment, the AP 300 may limit the medium time granted to a single frame transmission (e.g., an A-MPDU), and terminate the TXOP after transmission of the single frame. For yet another embodiment, the AP 300 may transmit as many frames of the same access category as possible during the TXOP, even if the frames are destined for different STAs (and thus originated from different packet queues).

To compensate for any burstiness of the traffic load and variability in network conditions, the AP 300 may determine the maximum medium utilization available to a new STA of a particular AC by varying the averaging interval. The AP 300 may employ various averaging techniques (e.g., sliding window and exponentially weighted), and various averaging windows may be applied. For some embodiments, averaging may be performed over multiple time windows, and thus multiple values of the maximum medium utilization (based on varying averaging windows) may be provided by the AP 300, thereby allowing the new STA to determine the variability in network conditions.

The present embodiments may also consider collisions within the AP 300, for example, resulting when more than one of the contention engines CE0-CE3 selects the same random back-off value. For example, the AP 300 may identify the occurrence of a collision and then restart the contention operation without serving any of the packet queues associated with the winning contention engines.

An example operation for estimating the available capacity of AP 300 (e.g., for a new STA) is described below with respect to the illustrative flow charts 600, 610, and 620 of FIGS. 6A, 6B, and 6C, respectively. Referring also to FIGS. 4 and 5, the AP 300 may first perform a plurality of medium access contention operations between the access categories (601). As described above, the contention engines CE0-CE3 are responsible for contending for medium access for packets belonging to access categories AC0-AC3, respectively. The contention engine that wins the contention period may be granted a TXOP during which the winning contention engine may serve a number of its corresponding packet queues (e.g., in a round robin manner) by transmitting packets queued therein onto the shared wireless medium. When the TXOP ends, the winning contention engine relinquishes the medium, and then another contention period begins (e.g., after a DIFS period).

For at least some embodiments, the AP 300 may perform at least a predetermined number of contention operations to allow the AP 300 to determine timing information indicating (1) time periods between successive contention period wins (e.g., grants of medium access and TXOPs) for each of the access categories and (2) time periods between successive TXOPs or service periods for each of the individual packet queues associated with respective sets of AC queues 410(0)-410(3).

The AP 300 may then determine, for a selected access category, a queue service interval based, at least in part, on the timing information derived from the plurality of medium access contention operations (602). As described above, the queue service interval for the selected access category may be denoted as the acQSI, and may indicate the time interval between the end of one medium access grant to the selected access category and the beginning of the next medium access grant to the selected access category.

The AP 300 may then determine a transmit opportunity (TXOP) duration for the selected access category (603). The TXOP duration may be determined from the timing information derived from the plurality of medium access contention operations, or may be separately determined (e.g., by timing the lengths of the TXOPs). It is noted that the TXOP durations may vary between the different access categories, and therefore the AP 300 may determine the TXOP durations for each of the different access categories AC0-AC3.

The AP 300 may then estimate a portion of the medium share that is available to the selected access category based, at least in part, on the TXOP duration and the queue service interval for the selected access category (604). For at least one embodiment, an estimate of the available medium share (MS) may be determined according to the expression:

$$MS = \frac{TXOP}{TXOP + acQSI}.$$

The AP 300 may estimate portions of the capacity or medium share that are available to other access categories by performing steps 602-604 for the other access categories.

The AP 300 may then advertise per-access category estimates of available capacity (605). As mentioned above, the AP 300 may embed the per-access category estimates of available capacity in information elements (IEs) of beacon frames, probe response frames, network query response frames, and/or other suitable frames or packets transmitted from the AP 300.

For some embodiments, the AP 300 may also estimate the available capacity or medium share on a per-user (e.g., per-STA or per-DA) basis. For some embodiments, the AP 300 may distribute or allocate the per-access category estimates of available capacity or medium share (determined in 604) between the various users (as indicated by their DAs). More specifically, the AP 300 may determine a number of STAs associated with the AP, allocate the available capacity or medium share between the associated STAs and a new STA, and then estimate the capacity or medium share available to new STA for one or more of the access categories (606). The AP 300 may then advertise per-user estimates of available capacity or medium share for one or more of the access categories (607).

Referring now to FIG. 6B, when the AP 300 performs the plurality of medium access contention operations, the AP 300 may instruct a number of the contention engines CE0-CE3, each corresponding to a respective one of the access categories AC0-AC3, to contend with each other for access to the medium (611). The AP 300 may insert a number of virtual packets into one or more packet queues associated with a respective one of the contention engines when the one or more packet queues are empty (612). This may ensure that the estimates of available medium share are consistent with a full buffer load of the AP 300. The AP 300 may then determine which of the contention engines CE0-CE3 wins access to the medium, for example, to allow the AP 300 to subsequently derive timing information associated with the winning contention engine (613).

As shown in FIG. 6C, to determine the queue service interval for a selected access category, the AP 300 may record a start time indicating when medium access is granted to the contention engine corresponding to the selected access category (621), and may record an end time indicating when medium access is terminated for the contention engine corresponding to the selected access category (622). Thereafter, the AP 300 may determine a time difference between the end time of one medium access grant and the start time of a next medium access grant, for example, to determine a value of acQSI for the selected access category (623).

The embodiments described above may be applied to, performed by, and/or utilized by one or more STAs corresponding to the AP's BSS. For example, a STA may use the estimated medium share of the new STA having a full buffer for the given access category to determine an upper-bound on the downlink throughput (TP) it would receive for traffic belonging to a given access category, as expressed below:

$$TP_{AC}=E[\text{utilization}]*PHYrate*MAC\text{eff} \quad (4)$$

where E[utilization] denotes the estimated medium share of the new STA having a full buffer for the given access category, PHYrate denotes the transmission rate used by the AP 300's transmitter for transmissions to the new STA, and MACeff denotes the efficiency of the AP 300's MAC layer. For some embodiments, the term E[utilization] may refer to the term "$MS_{newuser}$," described above.

Note that the PHYrate may be a determination of the achievable downlink PHYrate from the AP to the STA, and that the MACeff is a parameter accounting for the loss in throughput resulting from acknowledgement frames and other MAC-layer overhead.

The value of $TP_{AC}$ may be determined using the goodput instead of the PHYrate, where the goodput accounts the predicted packet error rate (PER) at steady state and the available transmission modes (e.g., beam-forming, diversity, and so on), as expressed below:

$$TP_{AC}=E[\text{utilization}]*goodput*MAC\text{eff} \quad (5)$$

The STA may estimate the downlink PHYrate achievable by the AP based on a measure of received signal strength indication (RSSI) of a beacon, a probe-response, or any other transmission from the AP in conjunction with the intersection of the set of capabilities advertised by the AP 300 and supported by the STA. The STA may also estimate the AP's service latency for a given AC using the parameters advertised by the AP 300. The upper-bound on the service latency (SL) of a given access category may be estimated as follows:

$$SL_{AC} = \frac{TXOPAC}{E[\text{utilization}]} \quad (6)$$

The embodiments described herein may be applied to an intermediate networking device (e.g., a wireless range extender in a network where the downlink packets served to the end STA are to be received by the range extender). In the context of a dual-radio configuration for which the link from the AP to the range extender (not shown for simplicity) is on a different channel, the WAN-metrics element (e.g., as defined in the Hotspot 2.0 standards) may be used by the range-extender to advertise its 'wireless' backhaul capacity.

For a system in which the wireless medium is shared between the backhaul and the access link (e.g., when the AP and the range extender communicate on the same channel as the range extender and the STA), downlink traffic to the STA may result in downlink traffic between the AP 300 and the range extender and between the range extender and the STA. Thus, for some embodiments, a serving device such as an AP or range extender may advertise the characteristics of its backhaul. The fraction of medium time available is shared between the downlink from the AP to the range-extender and the downlink between the range-extender to the STA. Thus, the maximum downlink throughput available to an access category of the end STA with a dependent back-haul may be expressed as follows:

$$TP\text{max} = \frac{E[\text{utilization}] * PHYrateAP * PHYrateRE * MAC\text{eff}}{PHYrateAP + PHYrateRE} \quad (7)$$

where $PHYrate_{AP}$ is the achievable downlink PHY rate between the AP and the range extender, and $PHYrate_{RE}$ is the achievable downlink PHY rate between the range extender and the STA. As per another embodiment, the calculation in equation (7) may use the goodput instead of the PHYrate for the AP and the range extender.

In the foregoing specification, the present embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of estimating an access point's (AP's) medium share available for a selected one of a number of access categories, the method comprising:

performing a plurality of medium access contention operations between the access categories;

determining, for the selected access category, a queue service interval based, at least in part, on timing information derived from the plurality of medium access contention operations;

determining a duration of a transmit opportunity (TXOP) for the selected access category; and estimating a portion of the medium share that is available to the selected access category based, at least in part, on the TXOP duration and the selected access category's queue service interval.

2. The method of claim 1, wherein the selected access category's queue service interval indicates a time interval between successive grants of medium access to the selected access category.

3. The method of claim 1, further comprising:
advertising the portion of the available medium share to a station.

4. The method of claim 3, wherein the portion of the available medium share is embedded within an information element of a beacon frame or a probe response transmitted from the AP.

5. The method of claim 1, wherein each of the medium access contention operations is performed by:
instructing a number of contention engines, each corresponding to a respective one of the number of access categories, to contend with each other for access to a medium;
inserting a number of virtual packets into one or more packet queues associated with a respective one of the contention engines when the one or more packet queues are empty; and
determining which of the contention engines wins access to the medium.

6. The method of claim 1, wherein determining the selected access category's queue service interval comprises:
for each contention period won by a contention engine corresponding to the selected access category:
recording a start time indicating when medium access is granted to the corresponding contention engine; and
recording an end time indicating when the medium access grant is terminated for the corresponding contention engine; and
determining a time difference between the end time of one medium access grant to the corresponding contention engine and the start time of a next medium access grant to the corresponding contention engine.

7. The method of claim 1, further comprising:
determining a number (N) of stations (STAs) associated with the AP;
allocating the portion of the available medium share between the number N of associated STAs and a new STA that is not associated with the AP; and
estimating an amount of medium share available to the new STA for traffic belonging to the selected access category.

8. The method of claim 7, further comprising:
determining a maximum throughput for the new STA based, at least in part, on a modulation rate and a packet error rate associated with transmissions to the new STA.

9. The method of claim 1, further comprising:
determining one or more service metrics based, at least in part, on the estimated portion of the available medium share, wherein the one or more service metrics are selected from a list including service latency, jitter, and capacity headroom available.

10. An access point (AP) to estimate an amount of available medium share for a selected one of a number of access categories, the AP comprising:
means for performing a plurality of medium access contention operations between the access categories;
means for determining, for the selected access category, a queue service interval based, at least in part, on timing information derived from the plurality of medium access contention operations;
means for determining a duration of a transmit opportunity (TXOP) for the selected access category; and
means for estimating a portion of the medium share that is available to the selected access category based, at least in part, on the TXOP duration and the selected access category's queue service interval.

11. The access point of claim 10, wherein the selected access category's queue service interval indicates a time interval between successive grants of medium access to the selected access category.

12. The access point of claim 10, further comprising:
means for advertising the portion of the available medium share to a station.

13. The access point of claim 12, wherein the portion of the available medium share is embedded within an information element of a beacon frame or a probe response transmitted from the AP.

14. The access point of claim 10, wherein the means for performing is, for each of the medium access contention operations, to:
instruct a number of contention engines, each corresponding to a respective one of the number of access categories, to contend with each other for access to a medium;
insert a number of virtual packets into one or more packet queues associated with a respective one of the contention engines when the one or more packet queues are empty; and
determine which of the contention engines wins access to the medium.

15. The access point of claim 10, further comprising:
means for inserting a number of virtual packets into a packet queue associated with a respective one of the access categories when the packet queue is empty.

16. The access point of claim 10, further comprising:
means for determining a number (N) of stations (STAs) associated with the AP;
means for allocating the portion of the available medium share between the number N of associated STAs and a new STA that is not associated with the AP; and
means for estimating an amount of medium share available to the new STA for traffic belonging to the selected access category.

17. The access point of claim 10, further comprising:
means for determining a maximum throughput for a first STA based, at least in part, on a modulation rate and a packet error rate associated with transmissions to the first STA.

18. The access point of claim 10, further comprising:
means for determining one or more service metrics based, at least in part, on the estimated portion of the available medium share, wherein the one or more service metrics are selected from a list including service latency, jitter, and capacity headroom available.

19. A non-transitory computer-readable medium containing program instructions that, when executed by a processor of an access point (AP), causes the AP to estimate an amount of medium share available for a selected one of a number of access categories by performing operations comprising:

performing a plurality of medium access contention operations between the access categories;

determining, for the selected access category, a queue service interval based, at least in part, on timing information derived from the plurality of medium access contention operations;

determining a duration of a transmit opportunity (TXOP) for the selected access category; and estimating a portion of the medium share that is available to the selected access category based, at least in part, on the TXOP duration and the selected access category's queue service interval.

20. The non-transitory computer-readable medium of claim 19, wherein the selected access category's queue service interval indicates a time interval between successive grants of medium access to the selected access category.

21. The non-transitory computer-readable medium of claim 19, wherein execution of the instructions causes the AP to perform operations further comprising:

advertising the portion of the available medium share to a station.

22. The non-transitory computer-readable medium of claim 21, wherein the portion of the available medium share is embedded within an information element of a beacon frame or a probe response transmitted from the AP.

23. The non-transitory computer-readable medium of claim 19, wherein each of the medium access contention operations is performed by:

instructing a number of contention engines, each corresponding to a respective one of the number of access categories, to contend with each other for access to a medium;

inserting a number of virtual packets into one or more packet queues associated with a respective one of the contention engines when the one or more packet queues are empty; and determining which of the contention engines wins access to the medium.

24. The non-transitory computer-readable medium of claim 19, wherein execution of the instructions causes the AP to perform operations further comprising:

determining a number (N) of stations (STAs) associated with the AP;

allocating the portion of the available medium share between the number N of associated STAs and a new STA that is not associated with the AP; and estimating an amount of medium share available to the new STA for traffic belonging to the selected access category.

25. An access point (AP) to estimate an amount of available medium share for a selected one of a number of access categories, the AP comprising:

a processor; and a memory storing instructions that, when executed by the processor, causes the AP to:

determine, for the selected access category, a queue service interval based, at least in part, on timing information derived from a plurality of medium access contention operations performed between access categories;

determine a duration of a transmit opportunity (TXOP) for the selected access category; and estimate a portion of the medium share that is available to the selected access category based, at least in part, on the TXOP duration and the selected access category's queue service interval.

26. The access point of claim 25, wherein the selected access category's queue service interval indicates a time interval between successive grants of medium access to the selected access category.

27. The access point of claim 25, wherein execution of the instructions cause the AP to further:

advertise the portion of the available medium share to a station.

28. The access point of claim 27, wherein the portion of the available medium share is embedded within an information element of a beacon frame or a probe response transmitted from the AP.

29. The access point of claim 25, wherein execution of the instructions to perform each of the medium access contention operations causes the AP to:

instruct a number of contention engines, each corresponding to a respective one of the number of access categories, to contend with each other for access to a medium;

insert a number of virtual packets into one or more packet queues associated with a respective one of the contention engines when the one or more packet queues are empty; and determine which of the contention engines wins access to the medium.

30. The access point of claim 25, wherein execution of the instructions further causes the AP to:

determine a number (N) of stations (STAs) associated with the AP;

allocate the portion of the available medium share between the number N of associated STAs and a new STA that is not associated with the AP; and estimate an amount of medium share available to the new STA for traffic belonging to the selected access category.

* * * * *